United States Patent [19]

Clark

[11] Patent Number: 4,600,280

[45] Date of Patent: Jul. 15, 1986

[54] DIGITAL AUDIO RECORDING/PLAYBACK SYSTEM FOR MOTION PICTURE FILM

[76] Inventor: Lloyd D. Clark, 15 Conrad St., San Francisco, Calif. 94131

[21] Appl. No.: 631,181

[22] Filed: Jul. 16, 1984

[51] Int. Cl.⁴ ............................................. G03B 31/00
[52] U.S. Cl. ......................................... 352/37; 352/5; 352/25; 352/27
[58] Field of Search ...................... 352/25, 26, 27, 37, 352/5

[56] References Cited

U.S. PATENT DOCUMENTS 3,932,032  1/1976  Weinstein ............................. 352/27

Primary Examiner—Monroe H. Hayes
Attorney, Agent, or Firm—David Pressman

[57] ABSTRACT

Sound is recorded on a motion picture filmstrip (20) by taking periodic samples (15) of an analog signal (13), digitizing each sample in the form of a sixteen-bit binary word (40), (41), (43), and representing each binary word on the filmstrip in the form of a group of bits (8) composed of black dots (26) and transparent spaces (28). Each dot represents a binary ZERO and each space a binary ONE. The groups of binary bits are disposed in a digitized soundtrack (8) on the filmstrip, between the visual frames (50) and the sprocket holes (54), either in lieu of or in addition to the regular analog "variable area" soundtrack (48). On the digitized soundtrack, the groups of bits are arranged in parallel rows (42) which are oriented orthogonally to the direction of elongation of the filmstrip. Each row consists of a group of starting bits (44), followed by three groups of binary bits, for the left (40), right (41) and center (43) audio tracks, respectively. Thus each row on the digitized soundtrack represents three samples of three analog audio signals. When the filmstrip is projected, the digitized soundtrack is illuminated with a lamp (102) and the shadow of the digital soundtrack is sensed by a plurality of photocells (100) which provide electrical output signals. These are conveyed to a digital-to-analog converter (110) which reconstitutes the original audio signals, which are then reproduced as audible sounds by loudspeakers (116, 112, etc.) The audio information may be represented by various other arrangements of the groups of binary bits.

6 Claims, 12 Drawing Figures

3h.

DIGITAL AUDIO RECORDING/PLAYBACK SYSTEM FOR MOTION PICTURE FILM

BACKGROUND

1. Field of Invention

This invention relates to sound movies, particularly to a method of providing the audio portion of such movies.

2. Prior-Art: Analog Optical Soundtrack Recording

The most common prior-art method for producing sound movies, i.e., for the storage of audio information on motion picture film, is the well known "variable-area" optical method. In this method, an elongated soundtrack runs down one side of the filmstrip, between one set of sprocket holes and the picture frames. This soundtrack commonly consists of an optically-translucent (or opaque) region whose width varies according to the instantaneous amplitude of the sound. During movie projection, the soundtrack is illuminated from behind with a lamp and lens and then viewed through a slit by a photocell. Due to the varying width of the transparent area of the soundtrack, the slit receives varying width illumination as the film moves. This causes the amount of light which reaches the photocell to vary correspondingly. The voltage which appears at the output of the photocell will thereupon vary linearly with the amount of light falling on its surface so that the output voltage of the photocell will represent the original audio. However it is usually not a faithful reproduction of original sound because of distortion created by, e.g., dirt on the filmstrip, wear of the soundtrack on the filmstrip, etc. The distortion usually takes the form of audible pops, scratches, rumbles, hisses, loss of frequency range, etc.

3. Prior-Art Magnetic Recording Schemes

Sound movies have also been made by applying a coating similar to that used on magnetic recording tape onto the motion picture filmstrip. This was unsuccessful because of technological difficulties. The magnetic medium did not adhere well to the motion picture film, resulting in a very short film life. In addition, because of the stiffness of the filmstrip, a high pressure was required to hold the magnetic track against the magnetic playback head. As a result, the track's recording medium, which contained abrasive iron oxide, eroded the playback heads to the point of uselessness after only a few showings of a film. This recording method also suffered from the usual noise sources present in magnetic tape recording.

4. Prior-Art Digital Recording Schemes

Russell, in U.S. Pat. No. 3,806,643, has taught another recording system. In Russell's system, analog electrical signals are converted to digital form and then stored on photographic film plates. He employs two data formats: one is serial (Russell, FIGS. 5, 6), as used in compact audio discs. In this case, the binary digital bits comprising a digital word are stored on a disc in a spiral pattern of ever-decreasing radius, much like the groove on a phonograph record. When the disc is rotated, the bits are read out seriatim. The other data format (Russell, FIGS. 7, 9) consists of blocks of data whose words are stored in parallel fashion. During readout, the entire filmplate is moved in a stepwise fashion so that one block of data at a time is located within the physical range of operation of a conventional beam-scanning apparatus. Then one row of data at a time is focused onto a photocell array and a horizontal row of bits, which comprise part or all of a word, or multiple digital words, is illuminated and focused onto a photocell array for electronic readout. In one case (Russell, FIG. 7) the bits in a row are illuminated seriatim. In another case (Russell, FIG. 9) an entire block of data is illuminated at once and one row at a time of said block of data is focused on a photocell array for seriatim readout.

While Russell's system is suitable for storage of large quantities of digital information, it has a number of practical disadvantages. It does not teach any way to provide the audio portion of a sound movie. Also, Russell requires one photocell per optical data bit. This can result in ambiguous, and thus false readouts of the digital data. Russell's system would thus be especially unsuitable for use with moving picture filmstrips because the filmstrip is continually moving during both recording and playback of the digitized audio information. Thus during such recording and playback, the film may wander from side to side. To require physical alignment between the physically separate recording and playback stations to a tolerance of less than one optical bit across the width of the column of bits would be impractical since each and every optical bit must be read out faithfully. It also requires precise scaling and positioning of the film plate and the data recording and playback components. Russell's means for scanning light beams are cumbersome and expensive. Further, Russell's requirement for stepwise motion of the film plates in the parallel data case is cumbersome.

Potter, in U.S. Pat. No. 2,595,701, has taught yet another digital recording and playback system. FIG. 1 of Potter shows a recording system in which the audio information is sampled and each sample is digitized to an amplitude resolution of eight bits. The eight-bit words representative of the amplitude of the respective samples are then converted to pulse-code modulation signals. Next, Potter uses a cumbersome arrangement employing a cathode-ray tube to cause a row of flashlamps to be fired in sequence starting at one end of the array and proceeding to the other end, instead of firing them simultaneously. Some lamps will fire and others will not in order to represent digital ONES and ZEROES. The flashlamps are imaged onto a moving photographic film strip. Ninety-six bulbs comprising twelve groups of eight flashlamps each are imaged across the width of the photographic film strip. The film in Potter's camera is moving continuously during recording. The motor which moves the film is driven at a constant speed by his data encoding system which also creates timing marks, one for each data row, through the use of an extra flashlamp whose image appears at one edge of the film. Since the bulbs are flashed serially while the filmstrip moves, the images of the bulbs will appear in sloped lines on the filmstrip. Potter proposes that the sloped rows be spaced apart by an amount which is 20 percent greater than the spacing between optical bits within a row in order to ensure that each optical bit will be read only once. This inefficient data packing reduces the amount of audio information which can be stored on a given area of filmstrip, resulting in a lower audio frequency response, reduced audio dynamic range, or both.

FIG. 5 of Potter shows a playback system. As the film is moved through the playback projector, a narrow framing slit causes the individual images of the flashlamps, which appear in sloped rows across the filmstrip, to be projected *seriatim* on a row of photocells. Again, Potter uses a cumbersome method employing a cathode ray tube to scan the photocell outputs seriatim in order to detect the presence or absence of optical data bits only when they are expected to be imaged on each photocell. The regular appearance of the synchronizing flashlamp image is used to control the speed of the motor which drives the filmstrip and to initiate each readout scan of the photocells. The combination of circuitry which detects the synchronizing spots, controls the motor speed and initiates the horizontal photocell scanning constitutes a closed-loop servomechanism for speed control. Such servomechanisms are cumbersome and expensive. Potter's system could not be easily or inexpensively adapted for use in standard motion picture equipment.

Again, as in the case of Russell, Potter uses one photocell per optical data bit, thus requiring precise registration of the optical data bit images and photocells. This results in the imposition of impractical mechanical tolerances when the data bit images must be made as small as the filmstrip resolution permits.

OBJECTS AND ADVANTAGES

Accordingly, one principal object of this invention is to provide a high-quality sound reproduction system for use with motion picture film. Another object is to eliminate the need for noise reduction circuitry now associated with optical soundtrack recording. A further object is to provide a soundtrack which can be applied to a motion picture filmstrip in addition to the prior-art optical soundtrack and which can be played back in a standard motion picture projector containing an optical, digital soundtrack detection system but with no need for an electromechanical feedback loop to synchronize the filmstrip speed to the digital soundtrack. This is desirable in certain circumstances where a theater owner might not be willing or able to pay the cost of the truly high quality digital sound system. Still further objects are to provide a high-quality soundtrack which is imaged directly on the motion picture filmstrip itself, thus becoming an integral part of the photographic record, to provide a movie sound recording system which is highly immune to distortion, including pops, scratches, rumble, hiss, etc. and which will tolerate minor variations in filmstrip speed, to provide an audio soundtrack which overcomes the disadvantages of magnetic recording means associated with filmstrips, and to provide a soundtrack whose digital information can be manipulated in a computer prior to recordation on the filmstrip.

Further objects are to provide a movie digital recording system in which the filmstrip can move continuously, in which only a fixed light source, lens, and photodetector array are required to read out the smoothly-scanned data, in which no-electro-mechanical-optical scanners are required for readout, in which a lower-cost readout system is provided, in which the soundtrack's positioning has reduced tolerance, and in which data validity is determined exclusively by electronic, rather than a combination of electronic and mechanical, means.

Additional objects and advantages of my invention will become apparent from a consideration of the drawings and ensuing description thereof.

DRAWINGS

In the drawings, which are not to scale:

FIG. 1—BASIC RECORDING SYSTEM

Figure 1:
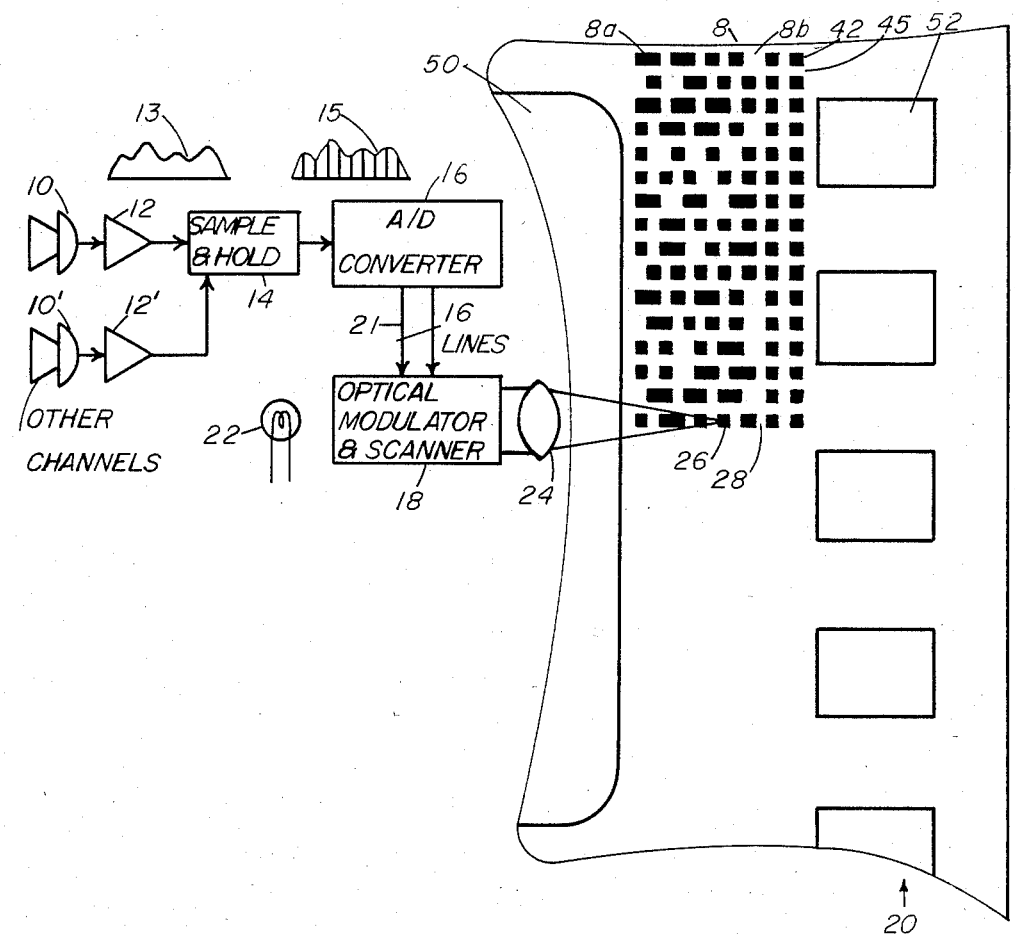
FIG. 1 shows a block diagram of a movie sound recording system according to the present invention.

FIG. 1 illustrates the basic principle of a recording system according to the present invention. According to the invention, an analog (continuously variable) electrical signal, which represents sound, is converted into a digital, binary (two-valued) format for recordation onto an optical medium, such as a photographic filmstrip. Specifically the present invention records or provides a digital soundtrack 8 onto a motion picture filmstrip 20. Filmstrip 20 comprises a conventional righthand row of sprocket holes 52, a series of picture frames, such as 50, and a lefthand row of sprocket holes (not shown) to the left of frame 50. Between holes 52 and the picture frames is sound track 8, described below.

To accomplish the formation of soundtrack 8, sound associated with the picture frames which are to be photographically formed on the filmstrip is first received by, for example, a microphone 10 which converts it to an analog electrical signal. This signal is amplified by an amplifier 12 which will provide a corresponding analog output signal 13 of varying amplitude. This signal, along with optional signals from other microphone-amplifier combinations, such as 10' and 12', is then sampled at a high rate by a sample-and-hold circuit 14. Each sample in the resultant sampled signal 15 is "held" for a short period of time while an analog-to-digital (A/D) converter 16 converts the value of each such sample to a binary digital signal representative of the amplitude of such signal. The resultant binary output signal of A/D converter 16 preferably is supplied in parallel form of a sixteen wire bus 21 to an optical modulator 18. Alternatively it may be supplied to a computer (not shown) for further processing and/or storage before it is ultimately recorded on filmstrip 20.

The recordation of the binary signal onto filmstrip 20 is accomplished as follows: Optical modulator 18 receives light from a light source 22 (in addition to the binary signal from converter 16) and supplies a light output in a binary-encoded form to filmstrip 20 (which has not been exposed), preferably while picture information is also being recorded onto filmstrip 20. Optical modulator 18 preferably is a single-celled device which contains a rotating polygonal mirror which causes a single output beam (which is appropriately modulated (turned on and off) according to the binary signal) to scan across the digital soundtrack strip area of film 20 so as to form soundtrack 8. This scanning method is well known to those engaged in imaging technologies.

Alternatively, optical modulator 18 may consist of a linear array of solid-state "shutters" or Bragg cell modulators, with each optical bit represented by one channel in the modulator assembly. Such an array will also be familiar to those skilled in the art of optics.

Regardless of the type of optical modulating scheme used, resultant soundtrack 8 on the filmstrip will consist of a series of rows, each composed of sixteen uniform binary bit positions. Adjacent rows of bits, such as 42, are separated by space rows, such as 45. Each bit position in each row is either a black or dark dot 26 (representative of a binary ZERO) or a white or clear region 28 (representative of a binary ONE). Adjacent black dots (ZEROES) and adjacent clear regions (ONES) will combine to appear as an elongated rectangular area, such as shown at 8a and 8b. (Alternatively, the dots can represent ONES and the clear positions ZEROES.)

FIG. 2.—THREE-CHANNEL DATA STORAGE ON A DIGITAL SOUND TRACK

Figure 2:
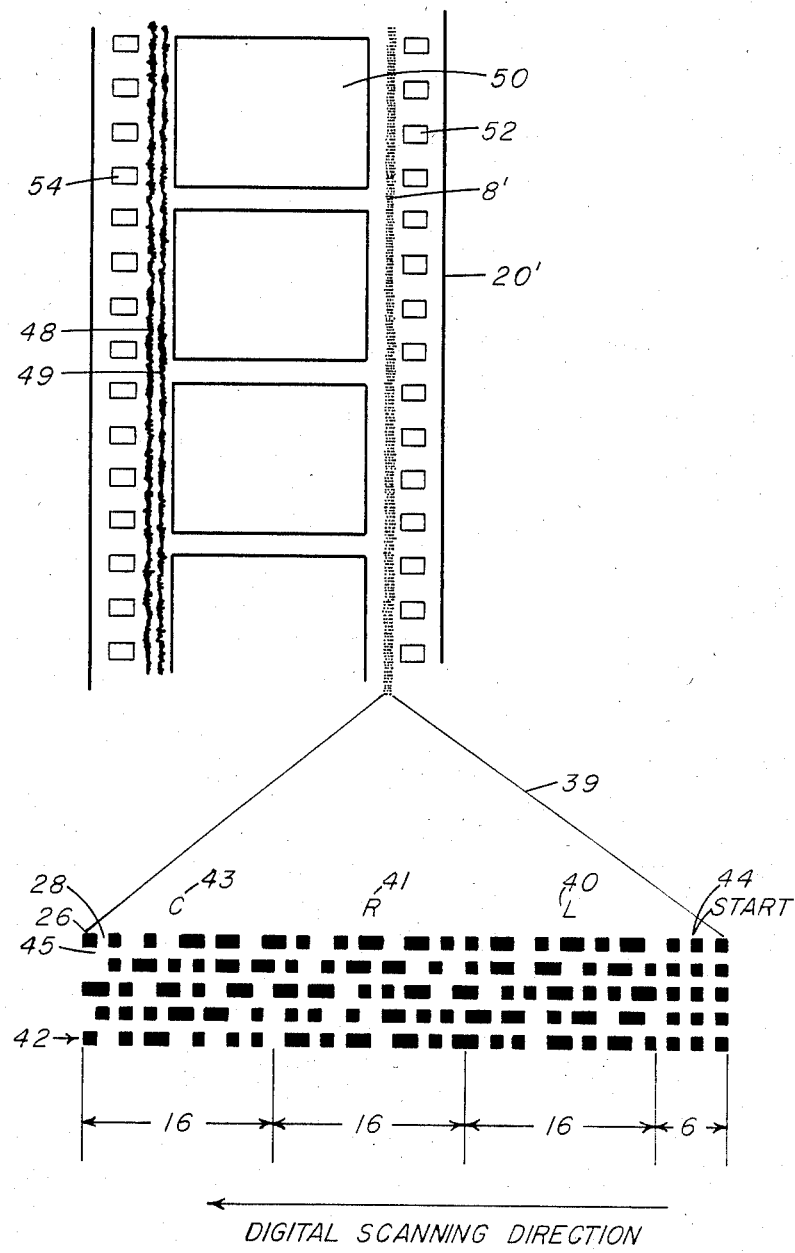
FIG. 2 shows a section of motion picture film having both a prior-art soundtrack and a soundtrack according to the present invention.

FIG. 2 shows an expanded view 39 of a more practical version of a three-channel digital soundtrack 8' on film 20'. A series of horizontal rows, such as 42, of black dots 26 and white spaces 28 are representative of the binary bits recorded in the manner described in connection with FIG. 1. However here the dots and spaces are arranged in groups, such as 40. Each group is representative of a digital binary word which is derived from one sample of the original analog signal. As with the rows of FIG. 1, row 42 is disposed horizontally, i.e., perpendicularly to the axis of motion of the filmstrip. Also, in this embodiment, several "start" bits 44 are employed at the beginning (right side) of each row at edge of sound track 8'. These are followed by a first group of bits 40, which is representative of a digital word or the instantaneous value of the amplitude of one sample of the audio signal in a "left" (L) channel, i.e., the sound picked up by a left-stage microphone.

A second group of bits 41 is provided to represent the right (R) audio channel, and a third group 43 is representative of a center (C) channel. Either one, both, or all of these channels may be utilized, and others may be added at will, by simply adding more binary digital words representative of the other channels.

While digital scanning in this figure is shown proceeding from right to left, as indicated by arrow 46, this convention is chosen only for reference in this discussion; scanning could also proceed from left to right.

The number of bits contained in each word, such as 40, is determined by the desired dynamic range of the sound to be reproduced. As a practical matter, 90 decibels exceeds the dynamic range normally required for sound reproduction. Thus the output of movie-sound system audio amplifiers, such as amplifier 12 of FIG. 1, normally embraces a potential dynamic range of approximately 90 decibels. This is equivalent to a voltage ratio of 31,623 (representing the highest amplitude) to 1 (lowest amplitude). A digital word with at least 15 bits will be required in order to quantize the output of amplifier 12 since $2^{15} = 32,768$. Many digital audio record players on the market today use 16-bit quantization. This value, also indicated in FIG. 1, will be adopted in the present discussion.

In addition to digital soundtrack 8' of the present invention, filmstrip 20' also contains two conventional, variable-area soundtracks 48 (the stereophonic right-hand channel) and 49 (the stereophonic left-hand channel), the usual strip of picture frames 50, and two rows of sprocket holes 52 and 54. Digital soundtrack 8' is positioned between frames 50 and right sprocket holes 52, while analog soundtrack 48 is provided in its conventional position for use by current sound projectors between left sprocket holes 54 and picture frames 50.

FIG. 3—DATA ENCODING AND DECODING

Figure 3A:
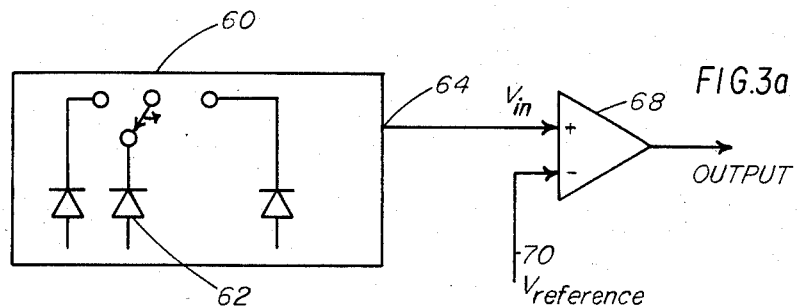
FIGS. 3(a to f) illustrate several photocell arrays and respective data storage elements according to the prior art and the present invention.
FIGS. 3g and 3h show a preferred data detection scheme and a preferred data storage scheme, respectively.
Figure 3B:
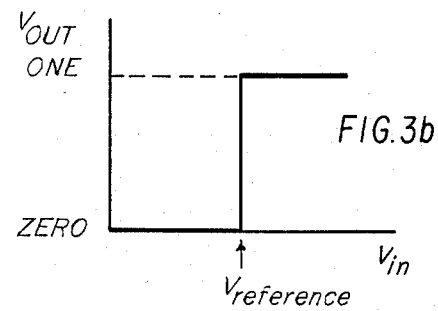

FIGS. 3a and 3b—Receiving Matrix and Output

To play back the digitally encoded sound, a monolithic semiconductor matrix 60 (FIG. 3a), such as that made by Reticon, Inc., is employed to receive light which is projected through soundtrack 8'. Matrix 60 contains a linear array of photocell diodes 62 upon which the soundtrack (8 of FIG. 1) is imaged. Matrix 60 also contains electronic circuitry for scanning the photocells sequentially and presenting seriatim at its output terminal 64 a voltage representative of the amount of light falling on the respective photocells 62 of the array. Output 64 of the scanned photocell array is connected to input terminal 66 of a voltage comparator 68. Another input terminal 70 of comparator 68 is maintained at a reference voltage, $V_{reference}$ ($V_r$). $V_r$ is normally selected to be the average of the maximum possible voltage (corresponding to an optical ONE) and minimum possible voltage (corresponding to an optical ZERO) values at output terminal 64.

FIG. 3b shows the response of comparator 68 to input voltages which lie above and below the threshold value $V_r$. As can be seen, when the input voltage, $V_{in}$, plotted on the abscissa, is below $V_r$, the output voltage is low and thus representative of a binary ZERO.

Figure 3C:
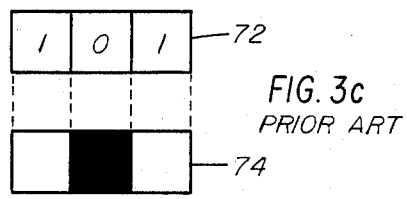

FIG. 3c—Prior Art Detector

FIG. 3c shows a diagram of three photocells in a prior-art optical detector 72 in alignment with an array of three data bit sources 74. Array 74 may represent a portion of digital track 8 on filmstrip 20. In practice, the data bit sources are superimposed over and focused upon the photocells, but are here shown displaced from the photocell array for clarity. Data bit sources 74 form an optical data word consisting of a ONE, a ZERO, and a ONE. The individual photocells of photodetector array 72 may be part of a monolithic semiconductor matrix as described above and will provide a binary output which is either a ONE or a ZERO, depending upon the light level present at the photosensitive surface of each cell. Thus the photocell array in this figure, which is perfectly aligned with the data bit sources, also correctly reads ONE, ZERO, ONE.

Figure 3D:
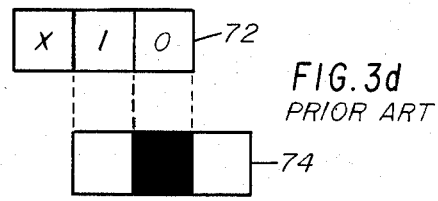

FIG. 3d—Prior Art Receptor, Filmstrip Shifted

In FIG. 3d, data bit source array 74 is shown shifted one bit to the right with respect to photocell array 72, as might occur, for example, when filmstrip 20 wanders to the right. The output of array 72 is X, ONE, ZERO, where X represents an unknown state due to the absence of any bit source in array 74 corresponding to the position of the first photocell in array 72. Thus the data word detected in this case is indeterminate. This is in accord with the prior-art arrangement in which a lateral displacement of the data image on the photocell array can cause a false reading.

Present Invention

A preferred embodiment of the present invention circumvents the above problem and thus allows latitude in film movements which are transverse (sideways) to the direction of film travel. This is accomplished by increasing the number of photocells in the photodetector array. If the filmstrip contains three data words of 16 bits each and one start word six bits in length, then the digital soundtrack would consist of a record 54 bits in length. If the total transverse film motion (left and right) were expected to be, say, 10% of the width of the soundtrack, or 5.4 bits, then all bits would always lie within the boundaries of the photodetector array if the detector array were $54+(0.1\times54)=59$ bits wide, assuming a one-to-one correspondence between the image of the data bits on the detector array and the cell dimensions of the array.

Also electrical noise will be present in the photodetector circuitry. If the amount of light reaching an individual photocell is near the cell's threshold value, electrical noise can cause a false reading to be obtained. Thus, there is a range around this threshold value in which the output of a photocell will be indeterminate. If the data image is displaced exactly one-half bit, this electrical noise can cause the data from the photodetector array to be indeterminate and therefore invalid.

Figure 3E:
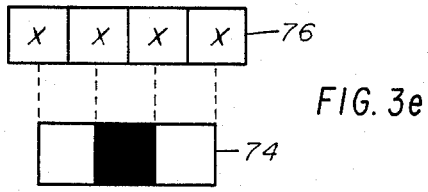

FIG. 3e—Four Photocells

FIG. 3e illustrates a worst case superposition of the data source array and the photodetector array. An extra photocell has been added to array 76 in FIG. 3e to demonstrate that even with the addition of sufficient extra photocells to receive all optical data bits, the problem of indeterminacy still remains when the filmstrip shifts. In this figure, the edges of the data bit sources in array 74 fall at the centers of the photocells, resulting in potentially indeterminate readings for all four bits. Since this problem is related to the interaction between a single optical data bit and a single photocell, it is necessary to use smaller photocells in the array.

Figure 3F:
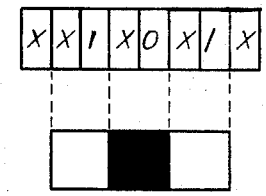

FIG. 3f—Eight Photocells

In FIG. 3f, an array 78 of eight smaller photocells is provided. The array is also physically wider than the image of the data bits. Nevertheless this embodiment suffers from the same fault as the one-on-one case described above: improper alignment of the photocells with the data will result in an indeterminacy caused by ambiguous thresholding. Thus, as indicated, at least five cells will provide indeterminate data, represented by "X's". However three photocells will receive unambiguous inputs and thus provide a correct output, so that each optical data bit will be correctly represented by at least one photocell.

The indeterminate data represented by the photocells with an "X" may be rendered inconsequential by higher-level thresholding, i.e., use of higher resolution analysis of the output of the signals from the photocells, plus the application of a suitable algorithm during both recording and playback. I.e., the potential error from the indeterminate data can be eliminated by providing circuitry which will categorize output signal from the photodetector array in one of three ranges, i.e. it will have two threshold levels. Such circuitry is indicated in FIG. 3g.

Figure 3G:
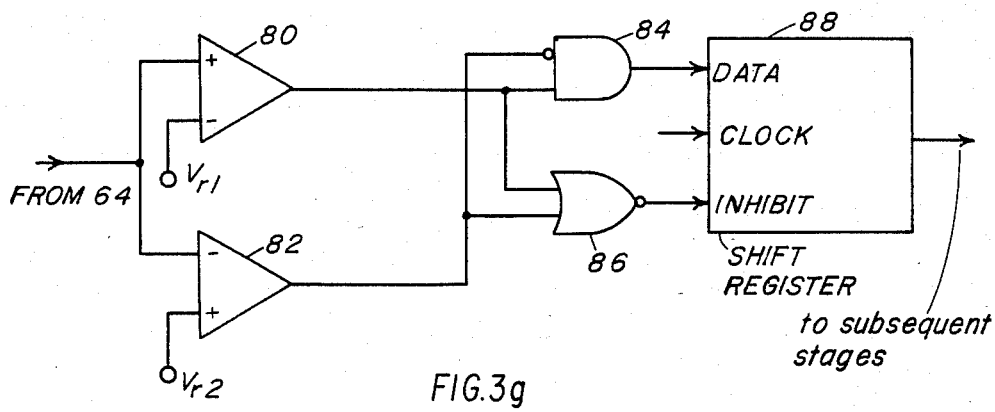

FIG. 3g—Logic Selection Circuit

Figure 4:
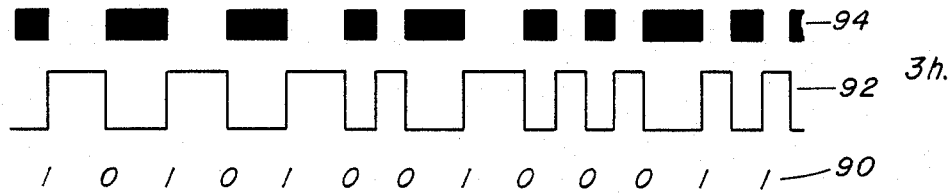
FIG. 4 shows a playback system according to the present invention.
Figure 4:
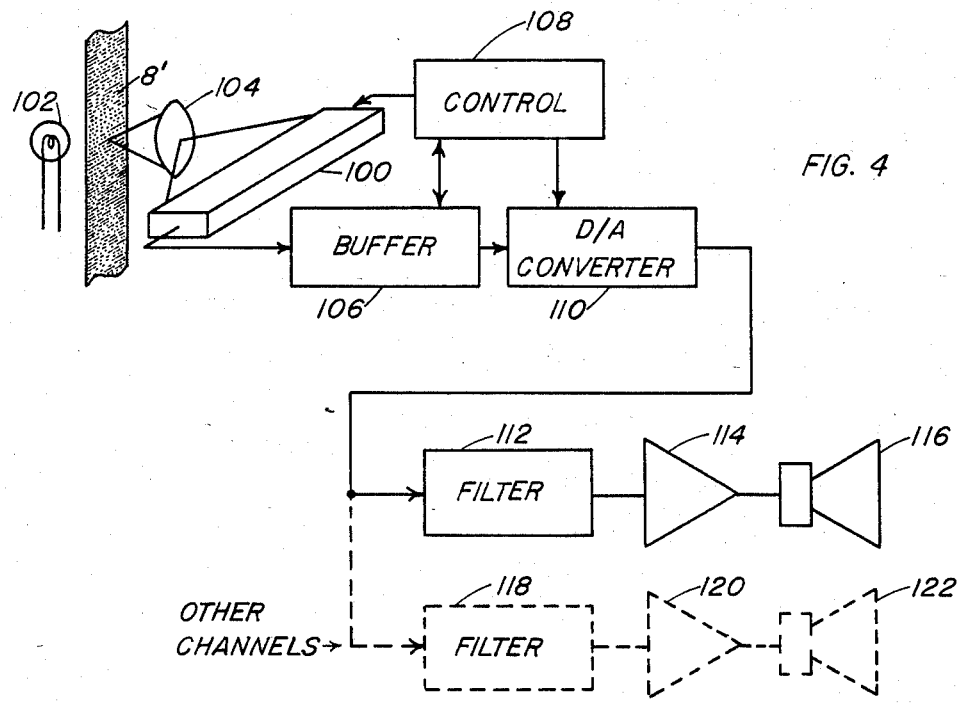

The output 64 of scanned photodetector array 60 is connected in parallel to the inputs of comparators 80 and 82. In response to varying input signal levels, the circuitry as shown produces the outputs indicated in the following truth table, designated Table 1, i.e., output 80 and output 82. An AND gate 84 and a NOR gate 86 further decode this information to produce the output values in Table 1 marked DATA and INHIBIT. These two signals are connected to the DATA and INHIBIT inputs of a shift register 88 which is the first stage of data buffer 106 of FIG. 4, below. A high speed clock signal is applied to the clock input of shift register 88. This is the same clock signal as that applied to the monolithic photodetector array. This causes each bit leaving the photodetector array to be applied to the input of shift register 88. $V_{r1}$ and $V_{r2}$ are made equal to two-thirds and one-third of the maximum voltage at output 64 of photodetector array 60, respectively. Thus, as will be easily understood by those skilled in the art of electronics, all data with

TABLE 1

| | Threshold Selection Truth Table | | | |
|---|---|---|---|---|
| CONDITION | OUTPUT 80 | OUTPUT 82 | DATA | IN-HIBIT |
| ⅔-MAX | 1 | 0 | 1 | 0 |
| ⅓-⅔ | 0 | 0 | 1 | 1 |
| 0-⅓ | 0 | 0 | 0 | 0 | output values lying between 0 and ⅓-maximum, and ⅔-maximum and maximum will be clocked into shift register 88 as ZEROES and ONES, respectively, while data lying in the ⅓-maximum to ⅔-maximum range will produce an inhibit signal and hence will not be clocked into shift register 88. Such "indeterminate" data (those between ⅓- and ⅔-maximum) will be effectively discarded by this electronic circuit. (The ⅓, ⅔ values used in this discussion are for purposes of illustration only and any other alternative convenient threshold values may be used.)

Reference to FIG. 3f will show that with one-level thresholding it would be possible for one, two, or three photocells to read a ONE or a ZERO in response to only one optical data bit. With the addition of the two-level thresholding, an optical data ONE or ZERO will be interpreted as a ONE or ZERO by at least one and at most two adjacent photocells. Similarly, two adjacent same-sense data bits will be interpreted as valid data by at least three, but no more than four, photocells. In order to successfully utilize this particular method for data validation, a suitable means for data encoding must be chosen.

One suitable data encoding and decoding technique employs the use of "Manchester encoding". This is a "phase encoding technique" which depends upon detection of logical transitions between two binary states, ONE and ZERO, and knowledge of the complement of the logical value of the signal just prior to a transition. A logical ONE is represented by a binary signal transition from a logical ZERO to logical ONE; a logical ZERO is represented by a transition from logical ONE to ZERO. No more than two same-sense data bits are ever adjacent to one another.

FIG. 3h—Long Data String

A longer data string is shown in FIG. 3h. The data to be encoded are indicated at 90, the Manchester-encoded data are designated at 92 and the digital sound track image representative of these data is designated at 94.

The Manchester-encoded data string requires ten optical bit spacings to represent five bits of original data. Thus the data encoding algorithm requires appropriation of two optical bit spacings for each data bit to be encoded. Hence if it is desired to encode the 54-bit data string above, for example, 108 optical bits will be required on the film. For certainty of detection, two photocells are required for each bit. If the film track is assumed to occupy a space equivalent to 59 bits, including the allowance for lateral film travel, then a photodetector array containing 4×59=236 photocells will be required.

In order to correctly decode the bit pattern seen by the photodetector array, the data buffer must be programmed to recognize the sign of each optical bit and whether one or two bits of the same sign are adjacent to one another. Because of the relative sizes of the optical data bits and the photodetectors, each optical bit will be correctly recognized by at least one photocell. As the image of the optical bit pattern wanders laterally across the photocell array, each optical bit could be correctly recognized by as many as two adjacent photocells. If the optical bit pattern contains two adjacent same-value optical bits, then at least three but no more than four photocells will have outputs representative of these two same bit values. Thus the data buffer (described below in connection with FIG. 4) will be programmed to detect one optical ONE when one or two adjacent logical ONES are encountered by the scanning circuitry; it will detect two adjacent optical ONES when either three or four logical ONES are encountered by the scanning circuitry, etc. Since the Manchester encoding scheme never contains more than two adjacent bits of the same sign, there will be no uncertainty in decoding due to higher bit counts corresponding to larger numbers of adjacent optical bits. The data detection scheme described above will also be forgiving of minor enlargements or de-enlargements of the optical data image as might be encountered during making of prints of the original film, or in case of slight defocusing in either the recording or playback process. As described herein, the decision whether a row of data is valid is made entirely by the electronics, not by a combination of mechanical and electronic information.

Manchester-encoding of data normally depends on timing to determine the logical value of a data bit. The data stream is broken into a series of equal-duration timing cells. Data transitions which occur at the edge of a bit cell reflect the complementing of data to be transmitted or detected during the transition which occurs at the center of a bit cell. In the case of the present invention, this timing is supplanted by the physical size of the data bits. Two adjacent, same-sign optical data bits reflect the complement of the data bit to be transmitted on the next optical transition.

FIG. 4—PLAYBACK SYSTEM OF INVENTION

During projection, digital soundtrack 8' (FIG. 4) is scanned by a linear, multi-element optical sensor (photodetector array) 100. One such photodetector array is manufactured by Reticon, Inc., 345 Potrero Avenue, Sunnyvale, CA 94086. While this discussion will be concerned with the digital word format shown in FIG. 2, that is one in which several "start bits" 44 and the binary digital audio words for all channels all lie on a single line, it will be understood that the invention is applicable to a "plain" digital soundtrack 8 of FIG. 1, or any other arrangement of such digital soundtracks.

Filmstrip 20' moves downward as indicated, in a direction perpendicular to the orientation of digital words 40. Thus rows, such as 42 (FIG. 2), are presented to scanner 100 in a parallel fashion. A light source 102, preferably consisting of a lamp and lens arrangement similar to the light source which is used to illuminate prior-art soundtrack 48, is positioned behind filmstrip 20 for uniformly illuminating soundtrack 8'. Each line of data on soundtrack 8 is thereby sequentially focused on photodetector array 100 by a lens 104.

Devices of the type made by Reticon, Inc. and envisioned for use in one embodiment of this invention detect information in parallel form, i.e., all data bits in row 42 (FIG. 2) are simultaneously imaged across the photodetectors of array 100. Rows 42 (FIG. 2) of data words 40 are sent out from Reticon-type photodetector array 100 on one line, in serial fashion, however. Thus, instead of many parallel lines connecting photodetector array 100 to data buffer 106, only one serial line is required. This brings about an economy of connections to the photodetector array. The data sensed by the photocells on photodetector array 100 are "clocked" in serial fashion out of the array and into the circuit of FIG. 3g, which is contained in data buffer 106. This concept is well understood by persons skilled in electronic engineering.

The oeration of sensor array 100 is governed by a control circuit 108. The same circuit also controls a data buffer 106 and a digital-to-analog (D/A) converter 110. Photodetector array 100 continuously scans optical soundtrack 8' at a high rate of speed. This speed is determined by the density of the digital bits in the optical soundtrack. If, for example, filmstrip 20' moves at the standard rate of 45.7 cm (18 inches) per second and the digitizing rate of the audio signal is 30 kHz, then there will be 656 rows, such as 42, per cm (1667 per inch). This implies a film resolution of 130 lines per millimeter, which is within the capability of most motion picture films. With the same spatial resolution transverse to the direction of film motion and 108 bits in each row of soundtrack 8', digital soundtrack 8 will be 0.83 mm (830 microns) wide. This dimension fits within the 0.84 mm (840 microns) motion picture film industry standard allowed for each of the two prior art stereophonic (left and right) tracks on the film. A tradeoff is possible: the optical bit density in the direction of film motion can be reduced by increasing the number of bits in each row.

If the digitizing rate is 30 kHz, then all bits in a row must be read out in 33.3 microseconds. If there are 236 detectors in a row, the clock frequency employed to read out the photodetector array must be at least 7.1 MHz.

In the interval between rows 42 (FIG. 2) of data words 40, the input to data buffer 106 will be all binary ONES. This is because the space between rows 42 (FIG. 2) of words 40 is clear. As the image of an edge of row 42 (FIG. 2) of data words 40 approaches photodetector array 100, the data will be indeterminate. Once a start word 44 (FIG. 2) is detected by data buffer 106, however, the machine's logic will assume that the data words that follow are valid until the end of a row of data is encountered. This end may consist of blank space or "stop bits", similar to the "start bits" described above.

Data buffer 106 then acts in concert with control circuit 108 to feed the first data word 40 to D/A (digital-to-analog) converter 110. D/A converter 110 then converts each data word, such as 40 (FIG. 2), into a pulse whose amplitude is proportional to such binary word. This pulse is then sent to a filter 112 which smooths the individual pulses into an analog signal of the type shown at 13 on FIG. 1. The smooth analog signal is then applied to the input of audio amplifier 114 whose output is connected to loudspeaker 116 associated with the left channel.

Next, data buffer 106 acts in concert with control circuit 108 to feed a second data word, such as 41, associated with the right channel, to D/A converter 110. This second word 40 is associated with the right channel, as shown in FIG. 2.

D/A converter 110 then converts this second data word 40 to a voltage representative of binary word 40. This voltage is connected to a filter 118 associated with the right channel. The output of filter 118 is connected to an audio amplifier 120 and a loudspeaker 122 associated with the right channel.

Lastly, the same sequence is applied for the center channel. (The same sequence would be repeated for any additional channels.) The sequence for reading one row of digital words 42 and applying their associated voltage values to audio amplifier 114 et seq must be completed in a time less than or equal to the inverse of the digitization rate.

FIG. 5—DIGITAL SOUNDTRACK WITH REDUCED RESOLUTION REQUIREMENTS

Figure 5:
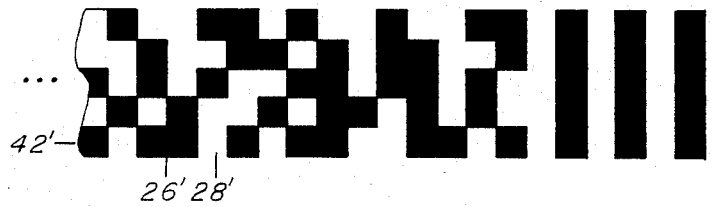
FIG. 5 shows a section of the optical digital soundtrack with a modification to the optical data bit packing density.

FIG. 5 illustrates a modification of the digital soundtrack which permits reduction of the spatial resolution required on the filmstrip by increasing the size of the dots. This alternative configuration is desirable since, although motion picture film resolution of 130 lines per millimeter is attainable, it is not as easily achieved in practice as a lower resolution.

According to this embodiment, the spaces (45, FIG. 2) between rows 42 of binary optical bits are eliminated by doubling the heights of the optical binary bits (e.g., the ONES such as 26 of FIG. 1), thereby causing ONES and ZEROES in corresponding positions and adjacent rows to merge. Similarly, the widths of the optical binary bits are doubled in the direction of the rows, i.e. perpendicular to film motion thereby using all of the available space between sprocket holes 52 and picture frames 50. The 108 bits of digital soundtrack 8 (FIG. 1) will fit comfortably into the motion picture industry film standard soundtrack width allotment of 1.93 mm. The film resolution required for optical digital soundtrack recordation, under this modified condition which provides a 30 kHz digitization rate, will be 65.6 lines per mm, an acceptable resolution in practice.

By thus doubling the widths of the rows of the digital soundtrack, such sound track will require twice the area to carry the same information. However each square dot or optical binary bit will have four times its former area—this because the height as well as the width of such dot has been doubled. Thus the dot resolution requirement has been greatly relaxed, both for recordation and readout.

Data buffer 106 must be able to recognize each new line 42 of data. This can be accomplished through the use of start bits 44 as described above, plus one simple additional decoding rule: the optical bit pattern from one row 42 to the next must change by at least one binary bit. This will ensure that no row is read as new data more than once by data buffer 106. Additionally, this modification reduces the clocking frequency of optical sensor 100 and data buffer 106 by half. All other aspects of recordation and playback as discussed above in connection with FIGS. 1 and 4 remain the same.

Doubtless other data recording, playback and encoding schemes will occur to those skilled in the art of optical digital sound recording. The above example was chosen to illustrate one possible method of optical-digital sound recording.

It is thus seen that the present invention is superior to the prior-art method of soundtrack recordation. Since sound information is stored in binary form, the present invention eliminates sources of amplitude noise such as hiss, pop, scratches, etc. caused by film wear and deterioration. In addition, since the information is stored in the form of binary digital data, noise associated with the analog soundtrack—either optical or magnetic—are not present.

In most applications, dual soundtracks (prior-art, variable-area soundtrack and the digital one of the invention) will be provided. This insures compatibility with both old, prior-art analog sound systems, and the new, digital sound system of the invention.

While the above description contains many specificities, these should not be construed as limitations on the scope of the invention, but rather as an exemplification of one preferred embodiment thereof. Many variations on the invention are possible, as mentioned in the description above. For example, the new digital soundtrack can be used on color slides or photographic prints. A short message could be encoded on the margin of a photograph and later read by the optical scanner means described above.

Further, a sound-only film membrane (in strip or other shape, such as rectangular) could be produced. In this case, the pictorial information would not be present. The filmstrip would contain only digitized, binary-encoded audio information. Such a sound-only film membrane could be packaged in a form similar to the magnetic tape cassette in wide use today. The sound-only film membrane will provide a substantial improvement in sound quality over that available from existing magnetic tape cassettes. Because of its relative insensitivity to vibration, when compared to a digital compact disc for example, the sound-only film membrane will provide excellent sound for use in automobiles.

Still further, a data storage film membrane can be provided. This would be similar to the sound-only film membrane described above, except that instead of sound, the binary information would represent digital data. In any case, the storage and readout methods would be the same as employed in the case of recording and playback described above in the case of the motion picture soundtrack. Accordingly the scope of the invention should be determined not by the embodiments illustrated, but by the appended claims and their legal equivalents.

I claim:

1. In a sound-accompanied photographic medium of the type comprising:
   a photographic medium comprising a membrane having a plurality of visible photographic representations of respective successive visible scenes thereon,
   said photographic medium having an elongated soundtrack containing a plurality of successive rows of digital bits,
   said rows being oriented parallel to each other and perpendicular to the direction of elongation of said elongated soundtrack,
   each row containing at least one group of binary bits, each group of binary bits representing a digital binary word, said bits consisting of substantially dark and substantially transparent areas of uniform size and shape with spaces therebetween, the groups of bits of successive rows representing successive samples of an analog audio signal, and means for reading said soundtrack, said means comprising a light source on one side of said membrane and a plurality of groups of photocells on the other side of said membrane, each group of photocells corresponding to a respective one of said binary bits, each group comprising at least two photocells.

2. The filmstrip of claim 1 wherein said plurality of groups of photocells are oriented in parallel to said rows of bits on said soundtrack, the number of photocells in each group being at least three.

3. The filmstrip of claim 3 wherein said reading means comprises scanning means for providing output signals representative of the states of said photocells, and means for classifying said output signals comprising a plurality of comparators, each being supplied with said output signals of said scanning means, and each further being supplied with a different reference voltage, each comparator arranged to classify the output signal representative of each photocell as either a binary ONE, binary ZERO, or INDETERMINATE.

4. The invention of claim 3 further including electronic circuit means for ignoring output signals which are classified as INDETERMINATE and for combining signals classified as binary ONE or ZERO in such a manner as to reconstruct the original sounds contained in the soundtrack.

5. An audio-representative medium, comprising:
a film membrane containing a soundtrack thereon, said soundtrack comprising an elongated area on said film membrane, said elongated area containing a plurality of rows of binary bits, said rows being oriented in a direction perpendicular to the direction of elongation of said elongated area, the bits in each row being arranged in at least one group, each group of bits in each row being a binary word representing a binary-encoded sample of an analog audio signal, the groups of bits in successive rows respectively representing successive samples of said analog audio signal, said bits comprising a plurality of spaced uniformly-sized dark and substantially-transparent areas, said dark and said substantially-transparent areas each having a uniform shape and size, whereby said elongated area can be scanned in a unidirectional path along its direction of elongation for recording or playback, thereby to write or read successive entire binary words at a time in continuous and uninterrupted manner so that said analog audio signal can be written or read along a unidirectional scanning path, said bits of said audio signal being encoded in a Manchester format and means for providing an output signal from each photocell, and means for classifying the output signal from each photocell as either a binary ONE, binary ZERO, or INDETERMINATE.

6. The invention of claim 5 further including electronic circuit means for ignoring output signals which are classified as INDETERMINATE and for combining signals classified as binary ONE or ZERO in such a manner as to reconstruct the original sounds contained in the soundtrack.

* * * * *